April 28, 1970   D. BRADEN   3,508,639
ARTICLE ORIENTING FEEDER BOWL
Filed Feb. 16, 1968
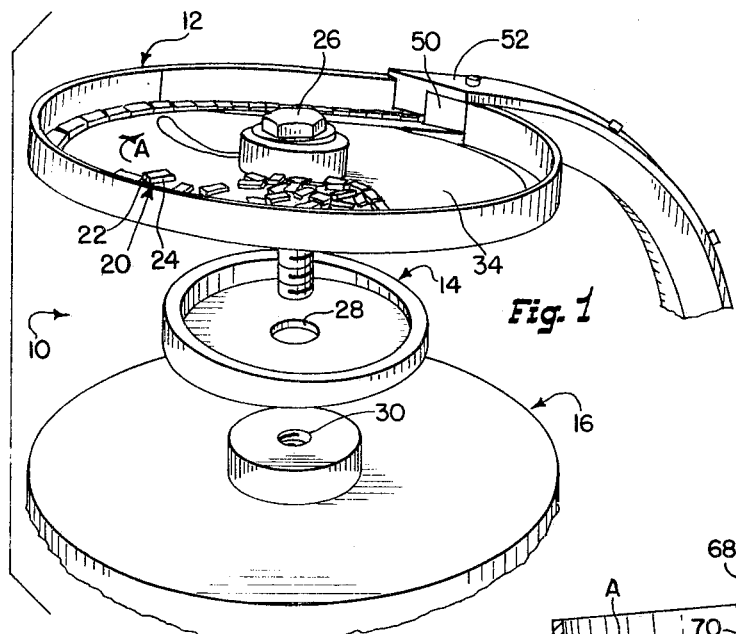
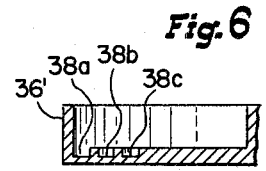
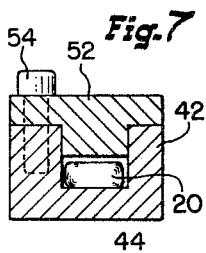
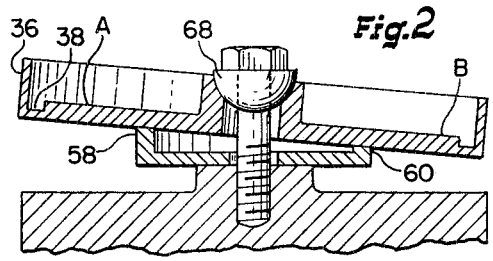
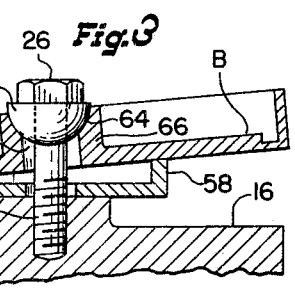
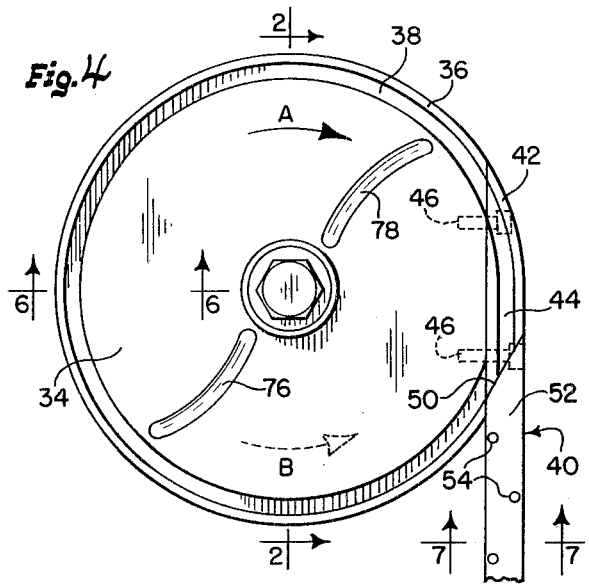
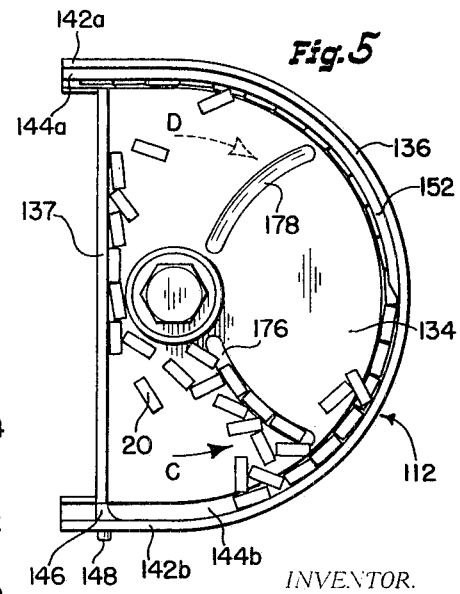
INVENTOR.
Denver Braden
BY Barry Clark
Robert W. Beart
His Att'ys

20

United States Patent Office 3,508,639
Patented Apr. 28, 1970

3,508,639
ARTICLE ORIENTING FEEDER BOWL
Denver Braden, San Diego, Calif., assignor to Illinois Tool Works Inc., Chicago, Ill., a corporation of Delaware
Filed Feb. 16, 1968, Ser. No. 706,010
Int. Cl. B65g 47/24
U.S. Cl. 198—33      13 Claims

ABSTRACT OF THE DISCLOSURE

Feeder bowl for use with vibratory drive unit has one or more curved, non-spiral, orienting grooves or tracks formed in it flat bottom surface for feeding articles in either a clockwise or counter clockwise direction depending upon the manner in which the bottom surface is tiltingly mounted to a vbratiory drve unit. Articles are discharged fiom the curved feed track through a discharge channel which may be placed in alignment with the feed track through an opening in the sidewall of the feeder bowl.

BACKGROUND OF THE INVENTION

Field of the invention

This invention relates to article feeding apparatus and more particularly to a feeder bowl used in a hopper-type feeding device which is designed to automatically orient and feed unsymmetrically shaped articles which are randomly introduced into the hopper in relatively large batches. The articles are delivered in a uniform orientation relative to each other and in a continuous line for further conditioning in another device.

Description of the prior art

Devices which serve the purpose of receiving articles in a jumbled mass and orienting them and feeding them to another device in a continuous stream have become widely used in view of current trends to automate the production of various articles as much as possible and especially the handling and assembly of small parts.

The most widely used feeding devices incorporate a vibratory actuator such as the type commercially available under the name "Syntron." These devices ase used with a feeder bowl which typically has a convex curved bottom surface and spiral or helical tracks formed in its side walls for guiding parts as they are moved upwardly along the track and out through a discharge chute. Although the spiral track feeder bowl is quite adequate for feeding parts, it has certain disadvantages in that the manufacture of the bowl is quite complicated and expensixe due to the special machining required for the curved bottom and the spiral feed track. Furthermore, the spiral tracked bowls can only be used for feeding parts in one direction.

SUMMARY

It is an object of this invention to provide a feeder bowl for use in a vibratory feeder apparatus which can be easily manufactured from a flat plate with relatively simple machining operations or which, alternatively, could be molded or cast in plastic or metal with little or no additional finishing.

It is another object of this invention to provide a feeder bowl which can be operated to feed in either a clockwise or counter-clockwise direction.

A further object of this invention is to provide a feeder bowl which has a flat bottom and a circular, constant depth feed groove formed therein rather than a spiral track formed on its vertical sides.

Another object of this invention is to provide a feeder bowl which can be used to feed in one direction or another and at varying feed rates merely by varying the angle of tilt of its bottom surface relative to the horizontal.

These objects are obtained by the feeder bowl of the present invention which preferably has a flat bottom and an upstanding external side wall which retains inside the bowl articles to be oriented which have been dumped into the bowl. A curved guide groove which is formed in the flat bottom directly adjacent the bowl side wall has its side walls spaced apart a distance less than the major dimension of the articles to be fed so that the articles will only be properly held and restrained in the grooves when they are arranged in the orientation desired. Although it is possible for improperly oriented parts to be fed around the bowl due to their having fallen into the feed groove sideways, such parts will not be fed out of a discharge opening in the bowl and into a discharge chute since the wall surfaces associated with the discharge chute are formed so as to engage and push improperly oriented parts out of the groove.

The feeder bowl of the invention is adapted to be used with commercially available vibratory feeding devices to which it is preferably fastened by means of a substantially wedge shaped coupling element. By varying the angular position of rotation of the coupling device relative to the feeder bowl, and without rotating the feeder bowl, it is possible to vary the angle of tilt of the feeder bowl from a maximum in one direction equal to the angle of the wedge to the same maximum in the opposite direction. Depending upon which of two general directions of tilt are chosen, the bowl will feed in either a clockwise or counter-clockwise direction when connected to an appropriate vibratory device. By reducing the angle of tilt from the maximum, the feed rate and the handling characteristics of the parts can be varied somewhat. It is also possible to feed certain types of parts with no tilt imparted to the bowl. However, such a level bowl will not feed nearly as well as a tilted bowl.

Where the situation demands it, the invention contemplates that the feeder bowl may have a plurality of feed grooves for feeding parts to a plurality of discharge chutes simultaneously. Furthermore, where space limitations restrict the use of a round feeder bowl, the invention contemplates a bowl which is substantially D-shaped in plan view.

To assist in the feeding operation of the bowl, one or more shallow feed assistance grooves may be placed in a generally radial direction in the bottom of the bowl. These assistance grooves help direct the parts being fed outwardly toward the feed groove.

The foregoing and other objects, features and advantages will be apparent from the following more particular description of a preferred embodiment thereof, as illustrated in the accompanying drawings.

BRIEF DESCRIPTION OF THE DRAWINGS

FIG. 1 is an exploded perspective view showing the feeder bowl of the invention in operation with parts being fed through a discharge chute toward a processing station.

FIG. 2 is a side sectional view taken on the line 2—2 of FIG. 4 showing the tilt of the bowl when parts are being fed in the direction A in FIG. 4.

FIG. 3 is a side sectional view similar to FIG. 2 showing the tilt of the bowl as it would appear on line 2—2 of FIG. 4 if the parts were to be fed in the direction B in FIG. 4 out of a discharge chute arranged in an opposite direction to the one shown.

FIG. 4 is a top plan view of the feeder bowl showing a discharge chute in one of two alternative directions of feed.

FIG. 5 is a top plan view showing a modification of the invention.

FIG. 6 is a modified showing of a view taken on line 6—6 of FIG. 4 which shows an alternative design of the feed track.

FIG. 7 is an enlarged cross sectional view taken on line 7—7 of FIG. 4 showing the discharge track and cover and their relationship to a part being fed.

DESCRIPTION OF THE PREFERRED EMBODIMENT

In FIG. 1, the invention can be seen in its operational environment. The improved feeder bowl and the elements operatively associated with it during use are indicated generally at 10. The feeder bowl, which is indicated generally at 12 is preferably tilted during operation, the tilt being imparted to it by means of a wedge-shaped coupling member 14 with respect to the horizontal top surface of a vibrating unit 16. The vibrating unit 16 will not be described since such devices are in common usage and commercially available. The basic function of the vibrating unit 16 is to transmit small vibrational movements to a device such as a feeder bowl which is attached to it. Vibrating drive units are readily available which will exert either a clockwise or counter-clockwise feeding movement to the contents of a bowl placed thereupon. The direction of feed imparted by the vibrating drive unit depends on the vibration movements being slower in one direction than the other. It will be noted in FIG. 1 that the feeder bowl 12 has been arranged to be vibrated so as to move the articles 20 placed therein in the direction indicated by the arrow A and therefore requires a clockwise drive vibrator unit 16.

Since the feeder bowl of the present invention orients articles in a feed groove, it is necessary that the articles 20 to be oriented have one pair of sides 22 which are shorter than the other pair of sides 24 and that the feed groove 38 in the feeder bowl has a width which is less than the length 24 of any article 20 to be oriented. With such relationships of dimensions, properly oriented articles will fall into the groove and be guided thereby while improperly oriented parts will either fall out of the groove or be wiped out of it as they approach the discharge chute. By way of example, it has been found that a flat bottom groove which is .150 in. wide and .025 in. deep will satisfactorily feed an article which is .135 in. wide, .200 in. long, and .050 thick.

In order to transmit the vibrating motion of the vibrating unit 16 to the feeder bowl 12 the feeder bowl is tightly fastened to the vibrating unit by means of a fastener 26 which passes through a clearance hole 28 in wedge member 14 and is retained in a threaded hole 30 in the vibrating unit 16.

As best seen in FIGS. 2 and 4 the feeder bowl 12 has a flat bottom surface 34 and vertically extending annular walls 36 extending upwardly therefrom. Immediately adjacent the side walls 36 a circular feed groove 38 which can have either a rounded or flat bottom is formed in the flat bottom 34 of the bowl for feeding articles moving in the direction of arrow A into a feed chute indicated generally at 40. The feed chute 40 comprises a vertically upstanding outer wall portion 42 which meets with and forms an extension of the feeder bowl wall 36. The feed chute 40 also includes a discharge feed groove 44 which is aligned with feed groove 38 for receiving articles from groove 38 and discharging them from the feeder bowl. Although the member 40 could be formed integrally with the bowl it has been found desirable to form it as a separate element. The bowl per se is designed to be operative to feed articles in either a clockwise direction A or a counter-clockwise direction B. However, to discharge articles fed in a counter-clockwise direction, a feed chute member (not shown) which is a mirror image of member 40 and having an opposite feed direction must be substituted for feed chute 40. Whichever feed chute is utilized, it is held to the feeder bowl 12 by fasteners 48 which are threadably received in threaded holes 46 in the base of bowl 12 as shown in FIG. 4. Although an angled wall surface 50 on feed chute 40 will engage and prevent improperly oriented parts from being discharged in groove 44, it is also desirable, and especially so if the parts are to be discharged vertically to another apparatus, for a cover plate 52 to be fastened to the top of chute 40 by means such as fasteners 54. The cover 52 is spaced from the bottom of groove 44 by an amount greater than the thickness of one article and less than the thickness of two articles so as to prevent more than one article from being discharged through the groove 44 at one time.

In order to tilt the bottom of the feed bowl so that end B is lower than end A for clockwise feeding as shown in FIG. 2 or so that end A is lower than end B for counter-clockwise feeding as shown in FIG. 3, a circular, wedge-like coupling member 14 is provided. The sides of the coupling member are preferably in the form of a cylinder which has been cut off at an angle equal to the maximum angle of tilt desired such that one side 58 is higher than the opposite side 60. Although the coupling member 14 is generally positioned in either of two opposite directions to achieve maximum tilt for either clockwise or counter-clockwise movement of articles in the feeder bowl, it is possible, by varying the angular position of rotation of the coupling member 14 relative to the bowl, to reduce the angle of tilt of the bottom 34 of the feeder bowl from that shown in FIGS. 2 and 3. As previously mentioned, it is possible in some instances to achieve some small degree of feeding with the bowl bottom level and without the use of coupling 14. However, the use of the coupling is preferred. It has been found that rotating the coupling member 14 to permit the bowl bottom to tilt at its lower end at an angle of 5 degrees will cause articles 20 in the bowl to be fed upwardly once they are in the groove 38 of the feeder bowl and to slide downwardly by gravity over the bottom surface 34 toward the bottom of the bowl when they are not properly located in the feed groove 38. In order to permit the discharge portion of the feeder bowl where the chute 40 is attached to face in a predetermined direction regardless of the direction of tilt of the coupling member 14 or the degree of tilt desired, the feeder bowl 12 is attached to the vibrating unit 16 by means of a swivel type fastening means comprising a screw 26, a spherical surface 64 formed on the upper portion of the inside of hub 66 formed integrally with the feeder bowl, and a generally hemispherically shaped washer 68. This swivel means permits the fastener 26 to apply an even load to the feeder bowl 12 to hold it in firm engagement with the vibrating unit 16. In order to permit the feeder bowl to tilt relative to the screw 26 an enlarged hole 70 is bored through the hub portion 66. Although the use of the wedge and swivel type fastening means just described permits the bowl to feed in either direction and at varying angles of tilt, it is obvious that if operation in only one direction is required the bowl could be formed with an angled boss on its bottom.

In those cases where it is difficult or impossible to mount a circular bowl in a location next to a machine due to a lack of sufficient space, a modified bowl 112 such as shown in the embodiment of FIG. 5 may be utilized. This bowl is similar in most respects to the bowl shown in FIGS. 1 through 4 in that it has a flat bottom 134, a curved side wall 136 and a feed groove 138. The bowl differs in that discharge can take place at either discharge wall and track 142a, 144a at one end of the bowl, or similar portions 142b, 144b at the other end of the bowl. In order to bring the center of bowl 112 closer to whatever apparatus the articles 20 are being fed to, the circular side wall 136 extends around only a little more than half of the bowl and terminates in a straight side wall 137. To prevent parts from falling out of the discharge opening at the lower part of the bowl, a blocking member 146 may be placed in the discharge track 144 and held to the discharge wall 142. A cover 152 performs the same purpose as cover 52.

Although the generally circular or D-shaped feeder bowls 12 (or 112) of the invention will orient and feed articles quite well even though the bottoms 34 (or 134) are flat and uninterrupted except for feed grooves 38 (or 138), it has been found that the bowls will feed articles much faster if one or more shallow feed assistance grooves such as 76, 78 (or 176, 178) are formed in the bottom of the bowls. These grooves are curved somewhat and preferably half round in cross section. They serve to provide a means for blocking the movement of parts sliding down the inclined surface 34 (or 134) and permitting the vibrating movement of the bowls to move them radially outwardly toward the feed groove 38 (or 138). The feed assistance grooves may be either larger or smaller than the part being fed. In FIG. 4, the grooves 76, 78, are shown as diametrically opposed. Although only groove 76 will be operative when end B of feeder bowl 34 is tilted downwardly the opposite groove 78 will be operative at those times when end A is tilted downwardly. Likewise, groove 176 in bowl 134 will be operative when end C of the bowl is tilted downwardly and groove 178 will be operative when end D is tilted downwardly.

FIG. 6 depicts an alternative form of feed grooves which could be utilized in place of the single groove 38 shown in FIG. 2. Occasionally, it is desirable to feed the same type of articles to a plurality of locations. The feeder bowl of the invention permits such parts to be fed from a single feeder bowl by providing a plurality of grooves such as 38a, 38b and 38c which feed articles to a plurality of similarly shaped discharge feed chutes (not shown) which will in turn direct the article by means of guide chutes (not shown) to the appropriate work stations.

Although the feeder bowl has been shown as having circular side walls it would be possible to make the walls and feed groove of slightly different configurations. The circular configuration, flat bottom, and straight side walls have been chosen for their simplicity in manufacturing as compared to the prior art bowls with their convex bottoms and spiral tracks.

While the invention has particularly been shown and described with reference to a preferred embodiment thereof, it will be understood by those skilled in the art that variations in form and details may be made therein without departing from the spirit and scope of the invention.

I claim:

1. In a feeder bowl for use with a vibratory feeder bowl oscillating unit, the improvement wherein said bowl comprises a flat bottom surface and an outer rim surface fixed to the said flat bottom for movement therewith and extending upwardly at generally right angles to said flat bottom surface, at least one generally curved feed groove being formed in said bottom surface, a terminal portion of said feed groove being formed adjacent the outer periphery of the bowl and positioned immediately adjacent a portion of said outer rim, said outer rim surface having an opening therein communicating with the terminal portion of said at least one feed groove to receive articles being moved through said groove and feed them out of said bowl, and a mounting portion located generally centrally of said bottom surface, said mounting portion being adapted to be rigidly mounted to the driving member of an oscillating unit whereby articles placed in said bowl will be moved by vibration of said bowl into said at least one feed groove and will be fed around said generally curved groove and out of said opening.

2. The feeder bowl of claim 1 wherein said bottom surface further includes at least one generally radially extending feed assistance groove in a region spaced from the terminal portion of the feed groove for engaging vibrating articles and guiding and assisting them to move radially outwardly toward said at least one generally curved feed groove.

3. The feeder bowl of claim 1 wherein a discharge chute member is affixed to said feeder bowl at said opening, said discharge member defining at least one channel which is aligned with said terminal portion of said at least one feed groove for receiving articles to be driven out of said bowl.

4. The feeder bowl of claim 1 and further including mounting means for mounting said flat bottom surface in a tilted position at an angle to the horizontal whereby articles placed on the flat bottom of the tilted bowl will be assisted by gravity to move toward the lower region of the bowl from where they may be fed by the oscillating unit in an upward direction around said generally curved track and out of said opening.

5. The feeder bowl of claim 1 wherein said mounting portion mounts the bottom surface of said bowl at an angle of about 5 degrees from the horizontal.

6. The feeder bowl of claim 3 wherein blocking means are associated with said discharge member for preventing the entry of articles into said discharge member which are not correctly oriented in said at least one feed groove.

7. The feeder bowl of claim 3 wherein said bottom surface includes a plurality of annular feed grooves and said discharge member includes a plurality of channels, each of which is aligned with a different annular groove.

8. The feeder bowl of claim 1 wherein the mounting portion on said bottom surface includes means for mounting said bottom surface so that either of two diametrically opposed regions thereon may be selectively positioned so as to be lower than the other whereby to permit said bowl to feed articles in either a clockwise or counter-clockwise direction when said mounting portion is mounted to a clockwise or counter-clockwise vibratory oscillating unit.

9. The feeder bowl of claim 1 wherein said bowl is generally circular in shape.

10. The feeder bowl of claim 3 wherein said outer rim includes fastening means adjacent said opening for selectively fastening one or the other of a pair of mirror image discharge members to said bowl to permit said bowl to feed articles out of said bowl in either a clockwise or counter-clockwise direction.

11. The feeder bowl of claim 1 wherein said bowl is generally D-shaped and said generally curved feed groove passes through the outer rim surface of at least one intersection of a curved part of the rim with a straight portion of the rim.

12. The feeder bowl of claim 1 wherein said mounting portion is mounted to an oscillating unit by a generally wedge-shaped coupling member which has a first generally flat surface for engaging a top surface of the vibrating unit and an opposing second generally flat surface at an acute angle relative to the first surface and adapted to engage the underside of the feeder bowl, said coupling member having a hole through its center adapted to receive a fastener joining said bowl to the vibrating unit and permitting the coupling member to be selectively rotated to a plurality of positions relative to the feeder bowl for varying the direction of tilt of said feeder bowl.

13. The feeder bowl of claim 4 wherein said mounting means comprises a fastener adapted to be fastened to the driving member of the oscillating unit, said mounting portion having an upper seat portion adapted to receive a hemispherical washer and having an interior hole of a diameter greater than the diameter of the shank of the fastener whereby to permit the bowl to be tilted to different positions and locked by pressure exerted on said hemispherical washer by said fastener.

References Cited

UNITED STATES PATENTS

| | | | |
|---|---|---|---|
| 2,801,025 | 7/1957 | Cookson | 221—169 |
| 2,924,355 | 2/1960 | Birkett | 221—167 |
| 3,215,251 | 11/1965 | Gleason. | |

FOREIGN PATENTS 1,053,639  1/1967  Great Britain.

RICHARD E. AEGERTER, Primary Examiner

U.S. Cl. X.R.

221—156

PO-1050
(5/69)

UNITED STATES PATENT OFFICE
CERTIFICATE OF CORRECTION

Patent No. 3,508,639        Dated May 5, 1970

Inventor(s) Denver Braden

It is certified that error appears in the above-identified patent and that said Letters Patent are hereby corrected as shown below:

Column 6, line 54, change "of" to -- at --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents